United States Patent
Li et al.

(10) Patent No.: US 9,690,054 B2
(45) Date of Patent: Jun. 27, 2017

(54) FOLDOVER OPTICAL FIBER FERRULE ASSEMBLY

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Gregory L. Klotz, La Verne, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 67 days.

(21) Appl. No.: 14/449,133

(22) Filed: Jul. 31, 2014

(65) Prior Publication Data
US 2015/0036980 A1    Feb. 5, 2015

Related U.S. Application Data

(60) Provisional application No. 61/860,863, filed on Jul. 31, 2013.

(51) Int. Cl.
*G02B 6/38*    (2006.01)

(52) U.S. Cl.
CPC ......... *G02B 6/3838* (2013.01); *G02B 6/3826* (2013.01); *G02B 6/3839* (2013.01); *G02B 6/3858* (2013.01); *G02B 6/3885* (2013.01); *Y10T 29/49* (2015.01); *Y10T 29/4984* (2015.01)

(58) Field of Classification Search
CPC .. G02B 6/3826; G02B 6/3838; G02B 6/3839; G02B 6/3855; G02B 6/3858; G02B 6/3885
See application file for complete search history.

(56) References Cited

U.S. PATENT DOCUMENTS

| 4,830,456 A | * | 5/1989 | Kakii | G02B 6/3656 385/59 |
|---|---|---|---|---|
| 5,212,756 A | * | 5/1993 | Eoll | G02B 6/4403 385/109 |
| 5,390,270 A | | 2/1995 | Hanzawa et al. | |
| 7,311,449 B2 | | 12/2007 | Barnoski et al. | |
| 7,343,770 B2 | | 3/2008 | Barnoski et al. | |
| 9,250,396 B2 | * | 2/2016 | Huang | G02B 6/3873 |

(Continued)

FOREIGN PATENT DOCUMENTS

| DE | 4423842 | 3/1995 |
| EP | 0514722 | 11/1992 |

OTHER PUBLICATIONS

International Search Report of Counterpart PCT International Application No. PCT/US2014/049316.

*Primary Examiner* — Daniel Petkovsek
(74) *Attorney, Agent, or Firm* — Liu & Liu (57) ABSTRACT

A ferrule assembly for an optical fiber connector has a first ferrule component having a structured surface defining features for aligning a section of an optical fiber, and a second ferrule component that is coupled to the first ferrule component by a web, wherein the web is flexible to allow folding the web to fold the second ferrule component over the groove in the first ferrule component. The optical alignment features includes one or more open grooves for receiving a bare section of an optical fiber. The section of the optical fiber is retained in the groove between the two ferrule components.

19 Claims, 6 Drawing Sheets

(56) References Cited

U.S. PATENT DOCUMENTS

2002/0150349 A1* 10/2002 Shahid ................ G02B 6/3885
385/65
2012/0257860 A1    10/2012 Li et al.
2013/0108220 A1*  5/2013 Gonzalez Garcia . G02B 6/3672
385/78

* cited by examiner

FOLDOVER OPTICAL FIBER FERRULE ASSEMBLY

RELATED APPLICATIONS

This application claims the priority of U.S. Provisional Patent Application No. 61/860,863 filed on Jul. 31, 2013, which is fully incorporated by reference as if fully set forth herein. All publications noted below are fully incorporated by reference as if fully set forth herein.

BACKGROUND OF THE INVENTION

1. Field of the Invention

The present invention relates to optical fiber connectors, in particular ferrules in optical fiber connectors.

2. Description of Related Art

There are many advantages of transmitting light signal via optical fiber waveguides and the use thereof is diverse. Optical signal transmission requires coupling of optical fibers in an end-to-end relationship, with the coupling being one source of light loss. In an optical fiber connection, an optical fiber connector terminates the end of a cable that contains one or multiple fibers, and enables quicker connection and disconnection than splicing to another connector holding the end of another cable. The connectors mechanically couple and align the cores of fibers so that light can pass end-to-end. Better connectors lose very little light due to reflection or misalignment of the fibers. Connectors, in both parallel/multiple fiber and single fiber links, operating at multi-gigabit rates must be assembled with subcomponents fabricated with sub-micron precision (i.e., a tolerance of less than 1000 nm). As if producing parts with such precision levels were not challenging enough, for the resulting end product to be economical it must be done in a fully automated, very high-speed process.

Currently, it is generally accepted that current fiber connectors cost too much to manufacture and the reliability and loss characteristics are more to be desired. The tolerance of the fiber connectors must improve, and the cost of producing fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-joining fiber terminals.

U.S. Pat. No. 7,311,449, commonly assigned to the assignee-applicant of the present invention, discloses various embodiments of ferrules that can be mass produced cost effectively by stamping. Some of those ferrules are configured for optical alignment without using alignment pins, relying solely on the alignment sleeves to provide alignment of the precisely shaped ferrules.

U.S. patent application Ser. No. 13/861,375 (published as counterpart WO 2014/011283), and U.S. patent application Ser. No. 13/440,970 (Published as US2012/0257860A1), which are commonly assigned to the assignee of the present invention, disclose improved ferrule and sleeve designs that can be incorporated in new optical fiber connectors, which results in low insertion loss and low return loss, which provides ease of use and high reliability with low environmental sensitivity, and which can be fabricated at low cost. In particular, U.S. patent application Ser. No. 13/440,970 discloses a ferrule having an open structure that has precision features formed thereon, namely open fiber clamping grooves, which can securely clamp the optical fibers without the need for epoxy or a complementary precision part. The width of the longitudinal opening defined between the lips along at least a section of the grooves is narrower than the diameter of the optical fibers to create a tight fit (e.g., an interference fit) with respect to the fibers, which allows the terminating end section of an optical fiber to be inserted laterally into the longitudinal opening of the groove, but which snuggly retains the optical fiber in the groove.

The present invention provides further improvements in ferrule designs, which provide ease of use and high reliability, and which can be fabricated at low cost.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

SUMMARY OF THE INVENTION

The present invention provides a ferrule assembly for an optical fiber connector, which improves on current ferrules. The ferrule assembly in accordance with the present invention provides ease of use and high reliability, and it can be fabricated at low cost.

In one aspect of the present invention, the ferrule assembly comprises a first ferrule component and a second ferrule component that is coupled to the first ferrule component by a web or tether of reduced thickness, wherein the web is flexible to allow folding the web to fold the second ferrule component over the groove in the first ferrule component. An optical alignment feature is defined on at least one of the first ferrule component and the second ferrule component for optical alignment (e.g., aligning a section of an optical fiber). At least one of the first ferrule component and the second ferrule component is provided with a structured surface defining features for optical alignment, In one embodiment, the optical alignment features include one or more open grooves for receiving a section of an optical fiber (e.g., the terminating end section of an optical fiber). The section of the optical fiber is retained in the groove between the two ferrule components.

In one embodiment, the optical alignment feature is defined in the first ferrule component, comprising a groove having a longitudinal opening, which is sized to receive and securely retain a section of an optical fiber in the groove by clamping the section of the optical fiber. The second ferrule component is a plate, which when folded over the groove in the first ferrule component, opposes and covers the groove in the first ferrule component.

In a further embodiment, the alignment feature includes similar grooves provided in the first ferrule component for receiving an alignment guide pin.

In another embodiment of the present invention, the first ferrule component and the second ferrule component may be structured as two complementary ferrule halves, each with a complementary groove that together retain the section of an optical fiber and/or an alignment guide pin.

In another aspect of the present invention, the ferrule assembly is precision formed by high throughput processes, such as stamping and extrusion. In one embodiment, at least the first ferrule component is formed by stamping to define the geometries of its external body and groove. In another embodiment, the entire ferrule assembly is formed by stamping to define the geometries of the first ferrule component, the second ferrule component and the interconnecting web.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The ferrule in accordance with the present invention further improves the current ferrule designs, which can be incorporated in an optical fiber connector to result in low insertion loss and low return loss, and which provides ease of use and high reliability with low environmental sensitivity, and which can be fabricated at low cost.

In one aspect of the present invention, the ferrule assembly comprises a first ferrule component and a second ferrule component that is coupled to the first ferrule component by a web or tether of reduced thickness, wherein the web is flexible to allow folding the web to fold the second ferrule component over the groove in the first ferrule component. An optical alignment feature is defined on at least one of the first ferrule component and the second ferrule component for optical alignment (e.g., aligning a section of an optical fiber). At least one of the first ferrule component and the second ferrule component is provided with a structured surface defining features for optical alignment, In one embodiment, the optical alignment features include one or more open grooves for receiving a section of an optical fiber (e.g., the terminating end section of an optical fiber). The section of the optical fiber is retained in the groove between the two ferrule components.

In one embodiment of the present invention, the ferrule assembly comprises a first ferrule component having a structured surface defining features for optical alignment (e.g., aligning a section of an optical fiber), and a second ferrule component that is coupled to the first ferrule component by a web or tether of reduced thickness (as compared to the thickness of the first and second ferrule components), wherein the web is flexible to allow folding the web to fold the second ferrule component over the groove in the first ferrule component.

In one embodiment, the optical alignment features includes one or more open grooves for receiving a section of an optical fiber (e.g., the terminating end section of an optical fiber). The section of the optical fiber is retained in the groove between the two ferrule components.

Figure 1A:
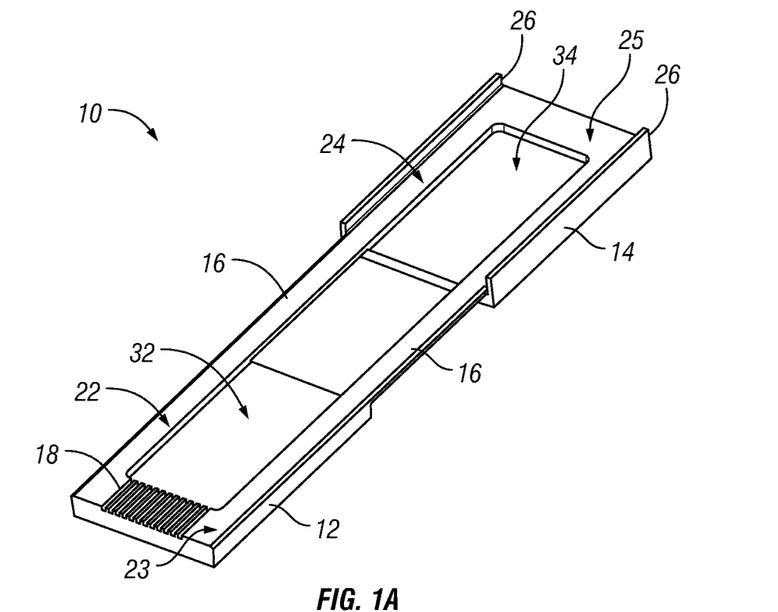
FIG. 1A illustrates a perspective view of a foldover optical fiber ferrule assembly in an open position in accordance with one embodiment of the present invention.

FIG. 1A illustrates a perspective view of a foldover optical fiber ferrule assembly 10 in accordance with one embodiment of the present invention. The ferrule assembly 10 is shown in its opened or unfolded position. It comprises a first ferrule component 12 and a second ferrule component 14 interconnected by strips of thin webs 16 extending between adjacent edges of the first and second ferrule components 12 and 14. The thickness of the webs 16 are significantly less than the thickness of the first and second ferrule components 12 and 14, to be flexible and bendable. The webs 16 and the first and second ferrule components 12 and 14 may be an integral, monolithic and/or unitary structure (i.e., a continuum without any connection interfacing surface structure; e.g., formed by die casting, etching, molding, powder metallurgy/sintering, or stamping from a single piece of stock material or blank), or may be separate pieces of same or different materials (e.g., made by die casting, etching, molding, powder metallurgy/sintering, or stamping) which are attached together (e.g., by welding, epoxy, rivets, etc.). Alternatively, the web 16 may be formed by molding a plastic over the first and second ferrule components 12 and 14, by a process generally known as over-molding.

Figure 1B:
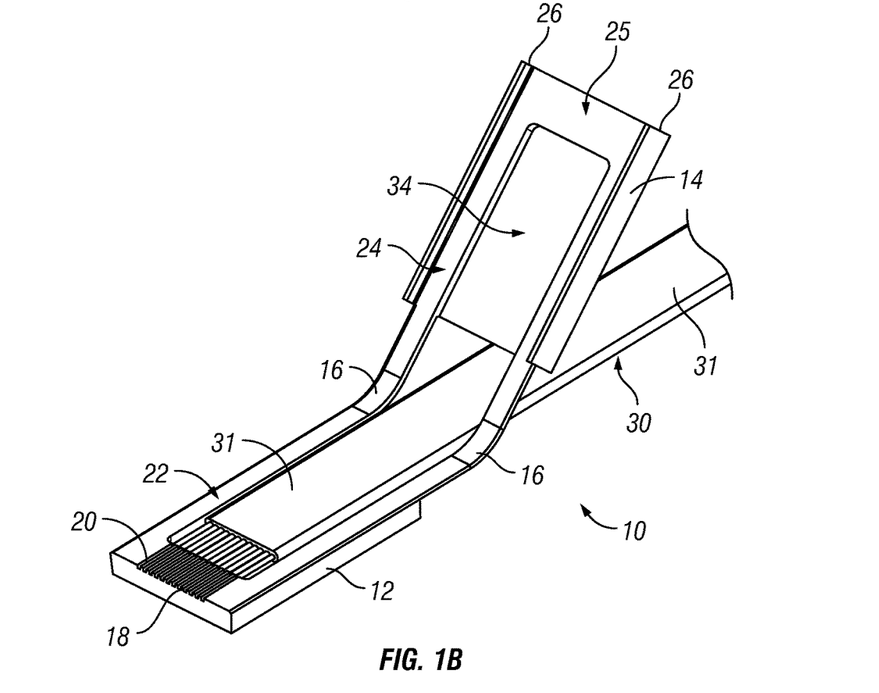
FIG. 1B illustrates the ferrule assembly in a slightly folded position.
Figure 1C:
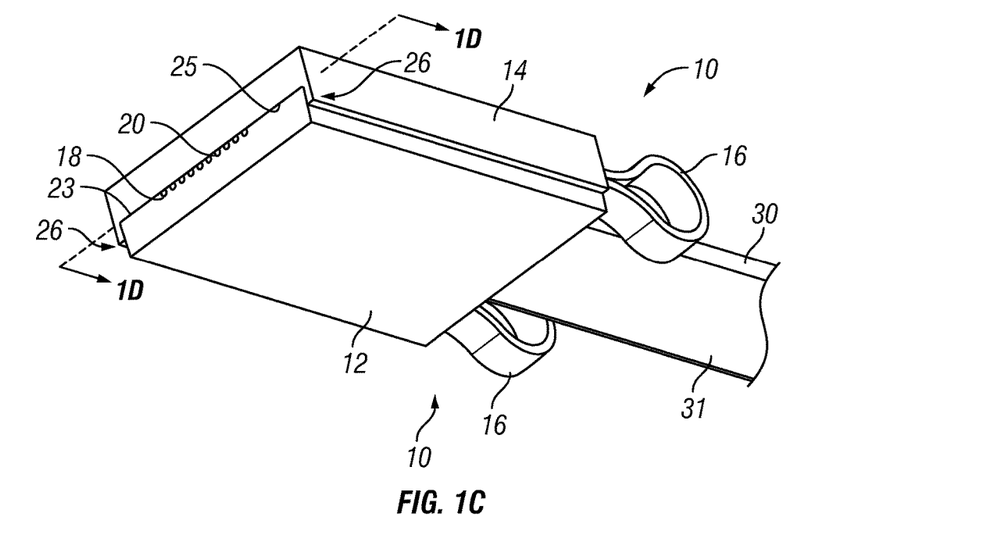
FIG. 1C illustrates the ferrule assembly in a closed or completely folded position.

In one embodiment, the first and second ferrule components 12 and 14 are each generally in the shape of a plate, with surface features defined on at least the opposing sides (22, 24) between the first and second components 12 and 14 (when they are in a folded over position shown in FIG. 1C). In the opened unfolded position shown in FIG. 1A, the surface features are defined on the same side of the overall ferrule assembly 10. The webs 16 extend between the sides 22 and 24 of the first and second ferrule components 12 and 14. In the illustrated embodiment, the webs 16 are parallel, spaced thin narrow strips, bridging a continuous surface between sides 22 and 24. Instead of two webs as shown, a single strip of web may be provided, or more than two strips of web may be provided.

The optical alignment feature defined at one side 22 (e.g., a major planar surface) of the body of the first ferrule component 12 comprises at least a groove 18 having a longitudinal opening, which is sized to receive and securely retain a section of an optical fiber 20 in the groove 18 by clamping the section of the optical fiber 20. In the illustrated embodiment, the groove 18 is sized to receive the terminating end section of the optical fibers 20 (bare sections of the optical fibers 20, with cladding exposed, without protective buffer and jacket layers). The structure of the grooves 18 will be elaborated further below. In the embodiment illustrated in FIG. 1A, there are a plurality of grooves 18 provided at the surface section 23 of the side 22 near one edge of the first ferrule component 12, which receive the bare terminating end sections of an array of optical fibers 20 from a fiber cable (e.g., a flat ribbon 30 shown in FIG. 1B). Further, a shallow recess 32 is defined on the side 22, to provide a space to receive the sleeve 31 of the fiber ribbon 30 (i.e., the protective fiber cable jacket) (see also FIG. 1B). Part of a section of the sleeve 31 of the fiber ribbon 30 is received within the recess 32, which provides additional room to accommodate the thickness of the sleeve 31 and the protective buffer and jacket layers on the fibers 20 within the section of the sleeve 31 received in the recess 32.

In this embodiment, the surface feature defined on the side 24 of the body of the second ferrule component 14 is a matching shallow recess 34, to provide a space to receive the remaining part of the section of the sleeve 31 of the fiber ribbon 30 received in the recess 34. However, in this embodiment, the side 24 of the second ferrule component 14 is not provided with grooves for optical fibers. The matching/mating surface 25 on the side 24 near one edge of the second ferrule component 14 is flat, acting to cover the grooves 18 on the first ferrule component 12 when the second ferrule component 14 is folded over to oppose the groove in the first ferrule component 12 (see also FIGS. 1B and 1C). The second ferrule component 14 includes raised flanges 26 along its opposing side edges.

FIG. 1B illustrates the ferrule assembly in a slightly folded position. In this configuration, it resembles an open "clamshell" structure. Each thin web 16 is bent from its plane, to form a fold 17 along each strip of web 16. Depending on the thickness of the thin strip of web 16, one or more scribe lines may be provided to facilitate bending/folding of the web. Alternatively, certain sections of the web 16 may be thinned (e.g., at the section of the strip of web 16 between the attachment points to the first and second ferrule components 12 and 14) to facilitate bending of the web 16.

Figure 1D:
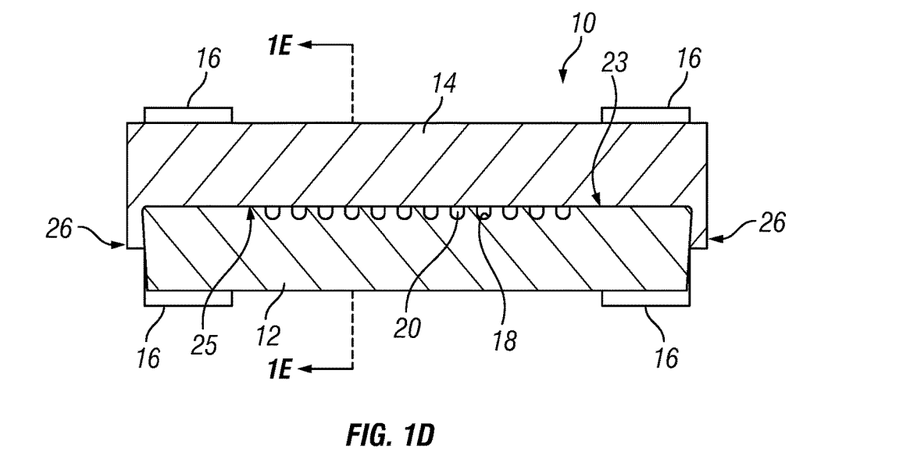
FIG. 1D is a sectional view taken along line 1D-1D in FIG. 1C.
Figure 1E:
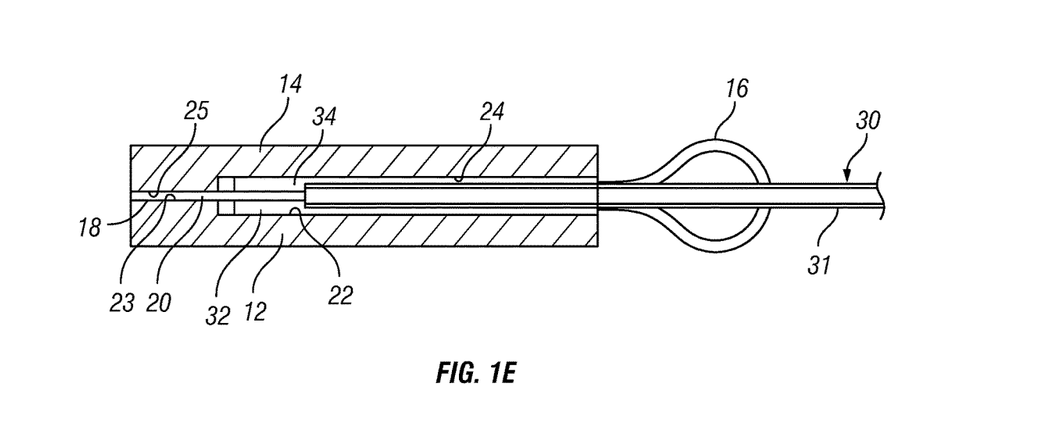
FIG. 1E is a sectional view taken along line 1E-1E in FIG. 1D.

FIG. 1C illustrates the ferrule assembly in a closed or completely folded position, with a view from the underside of the first ferrule component 12. FIG. 1D is a sectional view taken along line 1D-1D in the folded position shown in FIG. 1C. FIG. 1E is a sectional view taken along line 1E-1E in FIG. 1D. In this position, the second ferrule component 14 is completely folded over the first ferrule component 12, with the sides 22 and 24 of the first and second ferrule components 12 and 14 in opposing relationship, and in mating relationship other than at the recesses 32 and 34 and at the grooves 18. In this configuration, it resembles a closed "clamshell" structure. The section of fiber ribbon sleeve 31 is retained within the opposing recesses 32 and 34. The raised flanges 26 on the second ferrule component 14 are fitted over and mated against opposing side edges of first ferrule component 12, preferably by means of an interference fit or snap fit, to form a fastening/latching means to securely keep the first and second ferrule components 12 and 14 in the folded over position shown in FIGS. 1C-1E. Referring to the view shown in FIG. 1D, a slight draft angle may be provided on the opposing side walls of the first ferrule component (i.e., a taper diverging towards the second ferrule component 14) and a complementary taper of the flange 26 on the second ferrule component (diverging towards the first ferrule component 12) provide a snap coupling of the first and second ferrule components 12 and 14. Further, scribe lines may be provided on the web 16 at or near the attachment points to facilitate removing the web 16 from the first and second ferrule components 12 and 14 after folding the second ferrule component 14 over the first ferrule component 12 to the closed position shown in FIG. 1C. In this embodiment, the snap coupling is based on features defined on the first and second ferrule components 12 and 14.

In one aspect of the present invention, the first ferrule component 12 has an open structure that has precision features formed thereon, namely open fiber clamping grooves, which can securely clamp the optical fibers without the need for epoxy or a complementary precision part. The grooves and the width of the longitudinal groove openings are shaped and sized to retain the fibers without any clearance to allow for movement of the optical fibers 20 relative to the groove 18. In one embodiment, the first ferrule component 12 has a body having a plurality of open grooves 18 formed in parallel on one surface thereof for receiving and clamping the terminating end sections of optical fibers. The grooves 18 are structured to securely retain the fibers 20 (bare sections with cladding exposed, without protective buffer and jacket layers) by clamping the fibers 20, e.g., by an interference fit (or press fit). As referenced throughout herein, in the context of the present invention, and consistent with the customary usage in the mechanical field, the term "interference" refers to the dimensional relationship between mating parts, which is beyond the dimensional tolerances of individual parts. Tolerance is an intended limit to dimensional variations or deviations from a nominal dimension in connection with the fabrication of a part by a controlled process. The actual dimension would be within the tolerance range about the nominal dimension. In contrast, interference is achieved by intentionally sizing and shaping at least one of two mating parts with intended nominal dimensions to provide the desired interference fit between the two mating parts. There would be fabrication tolerances for the nominal dimensions that are intended to achieve the intended interference. In other words, even if there is zero tolerance in the fabrication process, the actual dimensions would then be the nominal dimensions of the mating parts, which would still result in the interference as intended. The interference fit assures that the fibers 20 are clamped in place and consequently the position and orientation of the fibers is set by the location and parallelism of the grooves 18.

In one embodiment as illustrated in FIG. 1D, the grooves 18 in the body of the first ferrule component 12 may be generally U-shaped channels each having approximately parallel walls extending from a semicircular bottom. The distance between the parallel walls of a groove 18 is sized to be slightly less than the diameter of the optical fiber 20 (bare fiber with cladding exposed, without protective buffer and jacket layers) to provide interference fit. (As referenced throughout herein, the diameter of the optical fibers refers to the diameter of the bare fiber with cladding exposed without protective buffer and jacket layers, e.g., 125 µm.) This interference fit alone can be sufficient to securely clamp the ends of the fibers 20 within the grooves 18.

In another embodiment, at least a section of the longitudinal opening of the groove is provided with opposing lips to provide a clamping effect. The width of the longitudinal opening defined between the lips/edges of the grooves 18 is made slightly narrower than the diameter of the bare sections of the optical fibers 20 to create a tight interference fit to snuggly retain the optical fibers 20. In particular, the opening is defined by lips formed at the opposing longitudinal edges of the longitudinal opening, to be slightly under-sized to allow the terminating end section of the optical fibers to be inserted laterally into the longitudinal openings of the grooves 18 with an interference fit. The magnitude of interference can be set by the manufacturing process so that loading the fiber into the groove causes elastic deformation or minor plastic deformation in the lip. The grooves should not be plastically deformed, otherwise it will affect the accuracy of the fiber locations.

Specifically, to attach the fibers 20 to the first ferrule component 12, the terminating end section of the fibers 20 are pressed lengthwise into the grooves 18 through the longitudinal openings with a snap action (i.e., not in the axial direction of the grooves), with the tip of the fibers 20 slightly protruding beyond the end face of the ferrule component body. Further, the width of the longitudinal openings and the grooves 18 are sized and shaped to snuggly retain the section of optical fibers 20 in the grooves 18 without providing any clearance for axial and lateral movements of the end face of the fibers relative to the grooves to ensure tight tolerance for optical coupling between end faces of two adjoining fibers. No epoxy would be required for retaining the bare fiber sections in the grooves given the interference along the mating surfaces between the fibers 20 and the grooves 18.

It is noted that the contact pressure resulting from the interference between the groove and fiber should not exceed the strength of the fiber. It should only be great enough to retain the fiber and generate friction that opposes axial sliding motion of the fibers within the grooves. Only a few micrometers of interference is necessary. In general, the interference is less than a few micrometers, more typically one or two micrometers.

It is noted that given the grooves 18 provides precise alignment of the optical fibers 20 with respect to the first ferrule component 12, the second ferrule component 14 does not need to be formed with as high tolerance as the first ferrule component 12. Given that lateral spacing of the optical fiber 20 are defined entirely by the grooves 18 in the first ferrule component 12, the second ferrule component 14 does not contribute to defining the lateral spacing of the optical fiber 20.

While the grooves 18 in the above-described embodiments are sized to self-retain by clamping the terminating bare sections of the optical fibers, the grooves 18 may be formed to retain the terminating end sections of the optical fibers 20 without clamping such sections (e.g., not self-retaining). The grooves 18 may be formed with a close tolerance (without interference fit) in U-shaped or deep V-shaped in the first ferrule component 12, and rely on the opposing surface 25 of the second ferrule component 14 to cover the grooves to tightly retain the bare section of the optical fibers 20 in the grooves. The grooves would still provide alignment of the lateral spacing of the optical fibers.

While the embodiment of FIG. 1 provides grooves 18 only on the first ferrule component 12, it is contemplated that in an alternate embodiment, complementary half-grooves (e.g., grooves of semi-circular and/or V-shaped cross-section) may be provided on opposing sides 23 and 25 of the first and second ferrule components 12 and 14, to form a complete closed groove to securely retain the terminating end sections of optical fibers 20 (bare sections of the optical fibers 20, with cladding exposed, without protective buffer and jacket layers). See also embodiment of FIG. 2 discussed below.

While in the illustrated embodiments, latches by means of flanges 26 are provided only on the second ferrule component 14, it is contemplated that raised flanges may be provided instead on the first ferrule component 12 to fit over the edges of the second ferrule component 14, or raised flanges may be provided partially on the first and second ferrule components 12 and 14. Other means of fastening or latching may be implemented, including external clips to keep the first and second ferrule components 12 and 14 in the closed position.

Still further, while the webs 16 are illustrated to be provided at the adjacent end or back edges (perpendicular to the longitudinal direction of the fiber ribbon 30) of the first and second ferrule components, it is contemplated that the webs may be provided along adjacent lateral side edges (parallel to the longitudinal direction of the fiber ribbon 30) of the first and second ferrule components 12 and 14.

It can be seen that the one-piece ferrule assembly in its closed position forms a ferrule for optical fibers. The one-piece design facilitates ease of use to affix the end sections of an array of optical fibers of a fiber ribbon to a ferrule (in this case a ferrule formed by a ferrule assembly in accordance with the present invention).

Figure 2:
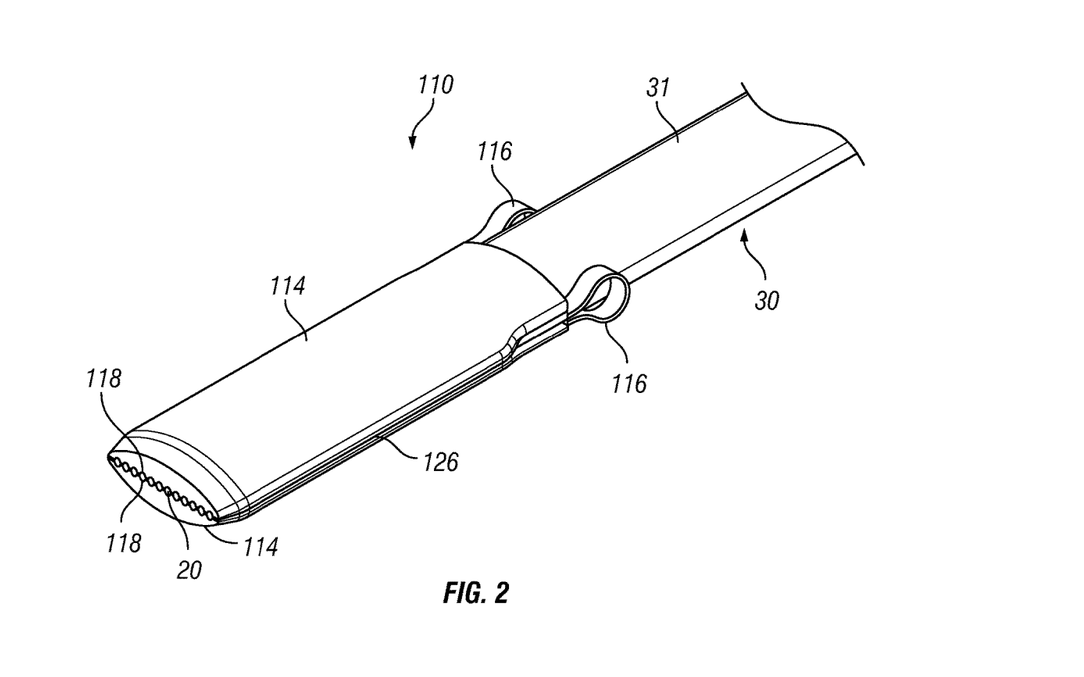
FIG. 2 is a perspective view of a foldover optical fiber ferrule assembly in a closed position in accordance with another embodiment of the present invention.
Figure 3:
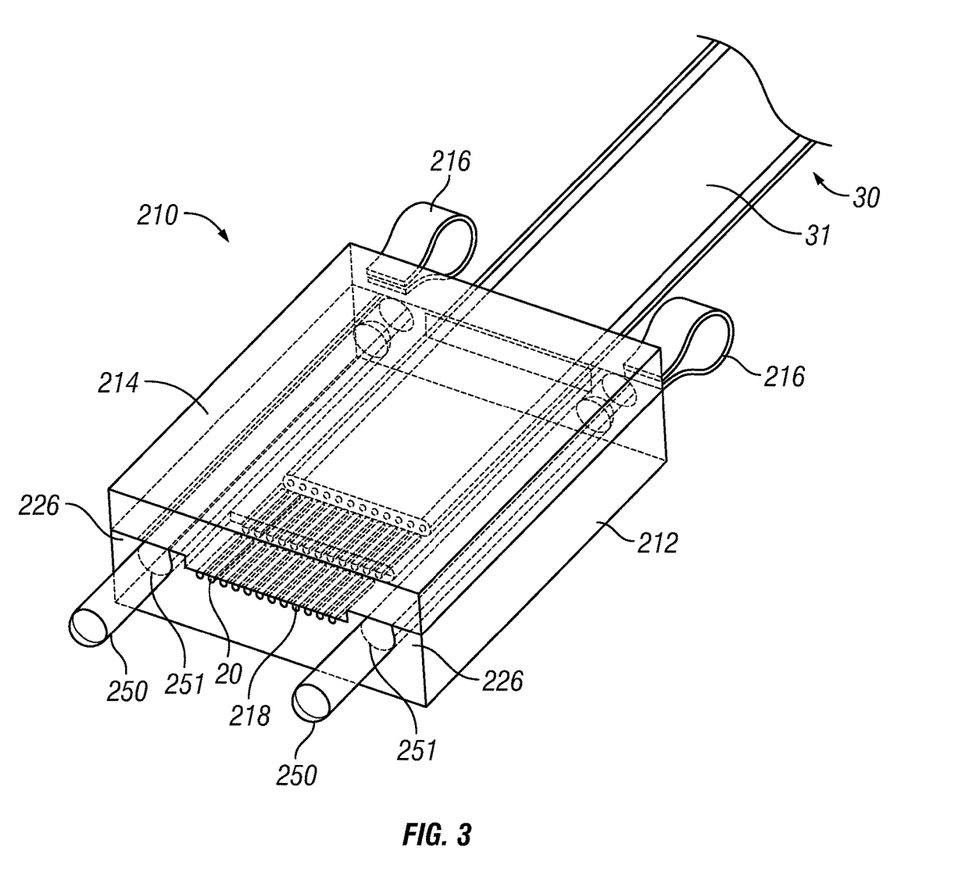
FIG. 3 is a perspective view of a foldover optical fiber ferrule assembly in a closed position in accordance with a further embodiment of the present invention.

FIGS. 2 and 3 illustrate further embodiments of ferrule assemblies. In a further embodiment of the present invention, the first ferrule component and the second ferrule component may be two complementary ferrule halves, each with a complementary groove that together retain the section of an optical fiber and/or an alignment guide pin. In particular, FIG. 2 is a perspective view of a foldover optical fiber ferrule assembly 110 in a closed position in accordance with another embodiment of the present invention. In this embodiment, the first and second ferrule components 112 and 114 of the ferrule assembly 110 are externally shaped with an overall generally oval cross-section. The geometry of the ferrule components have been disclosed in U.S. patent application Ser. No. 13/861,375 (published as counterpart WO 2014/011283). In accordance with the present invention, webs 116 are provided at the adjacent end or back edges of the first and second ferrule components 112 and 114, in similar manner as the web 16 in the previous embodiment shown in FIG. 1A. In this embodiment, each of the first and second ferrule components 112 and 114 are provided with open half grooves 118, which combine to form a round closed groove to retain the bare termination section of the optical fibers 20. Other than the grooves 118 and external surface profile of the first and second ferrule components 112 and 114 in this embodiment, the surface features of the opposing sides of the first and second ferrule components 112 and 114 may be similar to those of the ferrule assembly 10 in the previous embodiment shown in FIG. 1A. For example, recesses (not shown) are provided at the opposing sides of the first and second ferrule components 112 and 114 to define a space to receive the sleeve 31 of the fiber ribbon 30. Raised flanges 126 may also be provided along the lateral edges of the first and second ferrule components 112 and 114.

In a further embodiment, the alignment feature includes similar grooves provided in the first ferrule component for receiving an alignment guide pin. FIG. 3 is a perspective view of a foldover optical fiber ferrule assembly 210 in a closed position in accordance with a further embodiment of the present invention. In this embodiment, the first and second ferrule components 212 and 214 of the ferrule assembly 210 are externally shaped similar to the embodiment of FIG. 1A. The particular geometry of the ferrule components have been disclosed in U.S. patent application Ser. No. 13/440,970 (Published as US2012/0257860A1). In accordance with the present invention, webs 216 are provided at the adjacent end or back edges of the first and second ferrule components 212 and 214, in similar manner as the web 16 in the previous embodiment shown in FIG. 1A. Instead of raised flanges 26 on the second ferrule component 14 in the embodiment of FIG. 1A, raised flanges 226 are provided on the first ferrule component 212 in the present embodiment. A raised platform 225 is provided in the second ferrule component 214, to define a surface (similar to surface 25 in the embodiment of FIG. 1A) to cover the open grooves 218 on the first ferrule component 212. The grooves 218 may be similarly structured as grooves 18 in the previous embodiment of FIG. 1A. The raised platform 225 fits between the raised flanges 226, with an interference or snap fit. Further, the flanges 226 are wide enough to be provided with grooves 251, to receive alignment guide pins 250. Each groove 251 has a longitudinal opening, and each groove is structured (i.e., sized and shaped) to securely retain an alignment pin 250 in the groove by clamping the alignment pin 250 (much in a similar manner as clamping the bare terminating end section of optical fibers 20 in grooves 218). Other than the additional grooves 251 and the features of raised platform 225 and flanges 226 of the first and second ferrule components 212 and 214 in this embodiment, the surface features of the opposing sides of the first and second ferrule components 212 and 214 may be similar to those of the ferrule assembly 10 in the previous embodiment shown in FIG. 1A. For example, recesses are provided at the opposing sides of the first and second ferrule components 212 and 214 to define a space to receive the sleeve 31 of the fiber ribbon 30.

In another aspect of the present invention, the grooves and/or external geometry of the ferrule assemblies described above are precision formed by high throughput stamping process. In one embodiment, at least the first ferrule component is formed by stamping to define the geometries of its external body and groove. In another embodiment, the entire ferrule assembly is formed by stamping to define the geometries of the first ferrule component, the second ferrule component and the interconnecting web in a continuous stamping operation on a stock material (e.g., a strip of metal/alloy blank or stock). This produces a single part, which is efficient for subsequent parts handling. It is important to note that by stamping the body structure of first ferrule component along with the groove, the geometry of the overall structure of the ferrule assembly can be precisely defined. By precision stamping the external geometries of at least the first ferrule component and the grooves, the spacing of the grooves and the position of the grooves with respect to the exterior surface of the first ferrule component are precisely defined. Accordingly, the array of optical fibers held by the ferrule assembly can be precisely aligned to the ends of another array of optical fibers held by another similar formed ferrule assembly by using a sleeve, without having to use alignment guide pins (i.e., alignment is achieved by the sleeve acting on the external structure of the ferrule assembly). Alternatively, it is possible that the web between the two ferrule components is made by an over-molding process. The first and second ferrule components can be stamped on a carrier strip, and the carrier strip is then fed with the first and second ferrule components into an injection molding machine. The web would be molded over the ferrule components and allowed to cool. This provides a more compliant web that will not yield or break when bent.

A precision stamping process and apparatus has been disclosed in U.S. Pat. No. 7,343,770, which was commonly assigned to the assignee of the present invention, and which is fully incorporated by reference herein. The process and stamping apparatus disclosed therein may be adapted to precision stamping the ferrule assembly of the present invention. Further application of such stamping process is disclosed in U.S. patent application Ser. No. 13/440,970 (Published as US2012/0257860A1).

Figure 4A:
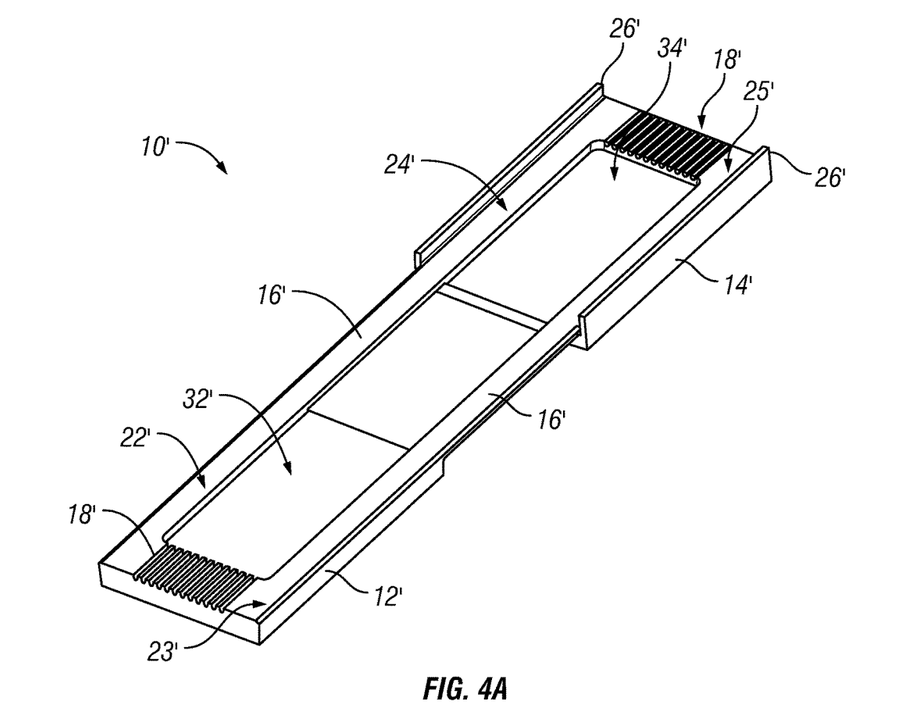
FIG. 4A is a perspective view of a foldover optical fiber ferrule assembly in an open position in accordance with another embodiment of the present invention.
Figure 4B:
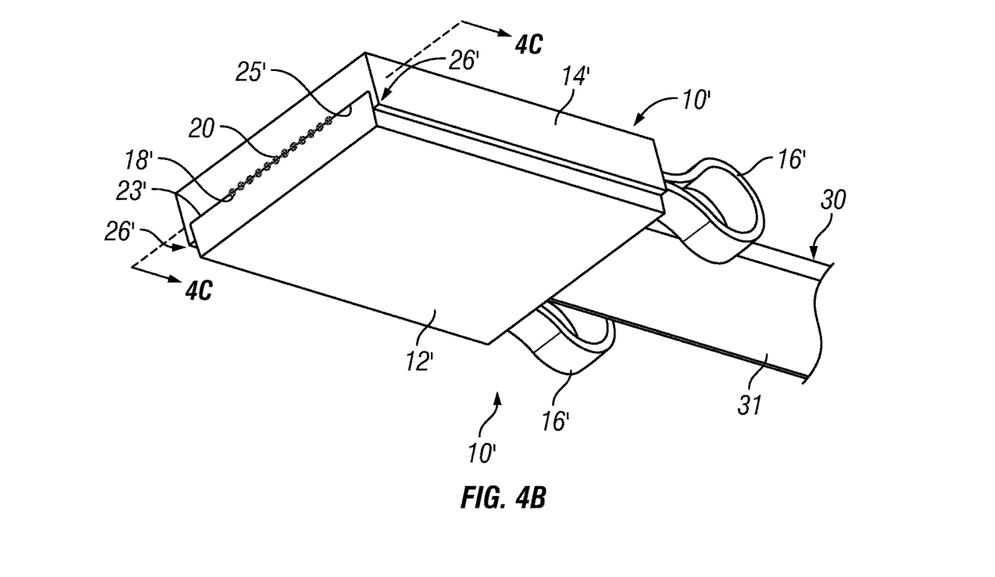
FIG. 4B illustrates the ferrule assembly in a closed or completely folded position.
Figure 4C:
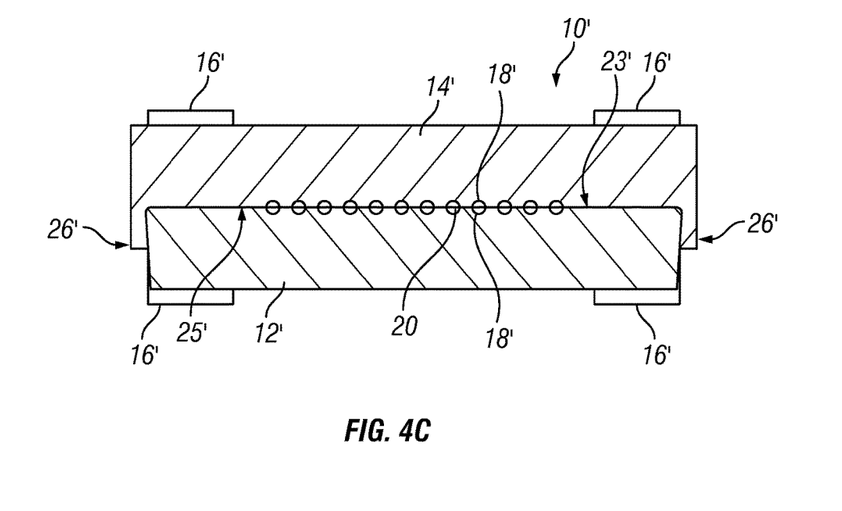
FIG. 4C is a sectional view taken along line 4C-4C in FIG. 4B.

Referring to FIGS. 4A-4C, the further benefits of precision stamping a modified embodiment of FIGS. 1A-1E to provide complementary grooves 18' on both the sides 23' and 25' of the first and second ferrule components 12' and 14' is explained. In particular, FIG. 4A is a perspective view of a foldover optical fiber ferrule assembly 10' in an opened position in accordance with another embodiment of the present invention. FIG. 4B is a perspective view of the ferrule assembly 10' in the closed position. FIG. 4C is a sectional view. In this embodiment, the first and second ferrule components 12' and 14' of the ferrule assembly 10' are structured generally similar to the ferrule assembly 10 in FIG. 1A. In accordance with the present invention, webs 16' are provided at the adjacent end or back edges of the first and second ferrule components 12' and 14', in a similar manner as the web 16 in the previous embodiment shown in FIG. 1A. In this embodiment, each of the first and second ferrule components 12' and 14' are provided with open half grooves 18', which combine to form a circular closed groove to retain the bare termination section of the optical fibers 20 (as more clearly shown in the sectional view in FIG. 4C). Other than the grooves 18', the surface features of the opposing sides of the first and second ferrule components 12' and 14' may be similar to those of the ferrule assembly 10 in the previous embodiment shown in FIG. 1A. For example, recesses 3" and 34' are provided at the opposing sides 22' and 24' of the first and second ferrule components 12' and 14' to define a space to receive the sleeve 31 of the fiber ribbon 30. Raised flanges 26' may also be provided along the lateral edges of the first and second ferrule components 12' and 14'.

The embodiment of FIG. 4 allows a greater degree of accuracy in the alignment of optical fibers 20 by allowing the grooves 18' in surface 23' and the matching grooves 18' in surface 25' to be formed with a single stamping tool. In a stamping or forging process, the punch (or die) can form both sets of grooves 18' on the first and second ferrule components 12' and 14', using a single set of features that are manufactured on the face of a punch. Consequently, the alignment and pitch between these features is inherently matched between the two opposing surfaces 23' and 25' when folded about the webs 16', with corresponding grooves on the first ferrule component 12' matching with the corresponding grooves on the second ferrule component 14' (e.g., groove number 1 in the first ferrule component 12' is always matched with groove number 1 in the second ferrule component 14', groove number 2 matched with groove number 2, and so on.) Furthermore, the webs 16' joining the two ferrule components 12' and 14' assure that when the ferrule assembly is used (e.g., deployed in the field), the first and second ferrule components 12' and 14' are always mated pairs so that in high-volume production, ferrule components produced from different tools and different production conditions/parameters are never mixed. This reduces the manufacturing variations between the two ferrule components used in a ferrule assembly, as ferrule components from the same production batch are matched always with the web tethering two ferrule components to be used to form a ferrule assembly. This degree of matching in the groove features could not be guaranteed in volume production if the ferule components 12' and 14' were manufactured without the webs 16. The groove of one ferrule component produced from one production batch may not match up as well to the groove of another ferrule component produced from another production batch.

In one embodiment, the above-described ferrule assemblies are made of a metal/alloy material (which may be a malleable stock material suitable for stamping to form the above described features of the ferrule assemblies), which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). For certain applications, the ferrule assemblies may be made of polymers.

The ferrule assembly in accordance with the present invention further improves the current ferrule designs, which can be incorporated in an optical fiber connector to result in low insertion loss and low return loss, and which provides ease of use and high reliability with low environmental sensitivity, and which can be fabricated at low cost. The one-piece ferrule assembly design facilitates ease of use to affix the end sections of an array of optical fibers of a fiber ribbon to a ferrule (in this case a ferrule formed by a ferrule assembly in accordance with the present invention). The ferrule thus formed by the one-piece ferrule assembly can be adapted for use in an optical fiber connector.

Figure 5:
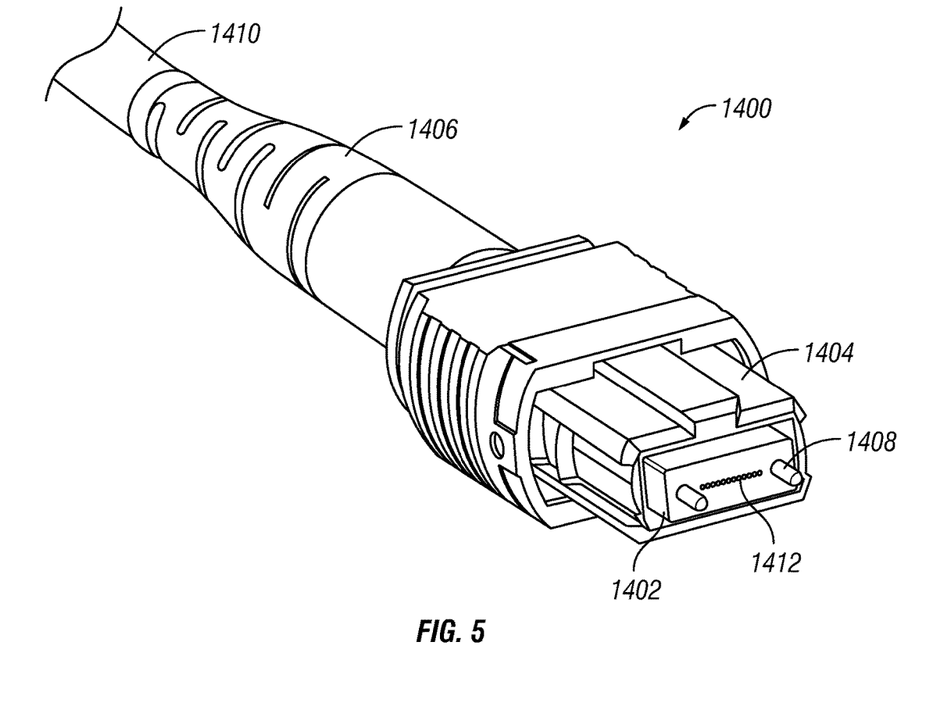
FIG. 5 illustrates an optical fiber connector incorporating the inventive foldover optical fiber ferrule assembly.

FIG. 5 illustrates an example of an optical fiber connector 1400 for a cable 1410 containing optical fibers 1412, which may be similar to connectors commercialized by other providers, which incorporates the inventive ferrule assembly 1402 (which may take the form disclosed above in connection with FIGS. 1-3) instead of a prior art ferrule. The connector includes an assembly of components consisting of the ferrule assembly 1402 (as will be further elaborated below), a ferrule housing 1404, a cable boot 1406, alignment guide pins 1408, and other hardware provided within and/or outside the housing (e.g., cable strain relief, crimp, biasing spring, spacer, etc.). The ferrule assembly in accordance with the present invention may be made backward compatible to be used to replace the existing ferrules in the optical fiber connectors offered by other providers.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A ferrule assembly for supporting an optical fiber in an optical fiber connector, comprising:
   a first ferrule component having a first body;
   a second ferrule component having a second body;
   an optical alignment feature for an optical fiber defined in at least one of the first body and second body; and
   a web connecting the second ferrule to the first ferrule, wherein the web is flexible to allow folding of the second ferrule component over the first ferrule component, wherein the optical fiber is held between opposing sides of the first ferrule component and the second ferrule component in a folded over configuration, and wherein the first body, second body and the web are part of a monolithic metal structure.

2. The ferrule assembly as in claim 1, wherein the first ferrule component has a first edge and a first surface at which the optical alignment feature is defined, and the second ferrule component has a second edge adjacent to the first edge and a second surface, wherein the second surface faces the first surface in the folded over configuration, wherein the first edge is an edge of the first surface and the second edge is an edge of the second surface, and wherein the web is connected to the first edge and the second edge.

3. The ferrule assembly as in claim 2, wherein the web has a surface that is coplanar with the first surface of the first ferrule component and the second surface of the second ferrule component.

4. The ferrule assembly as in claim 1, wherein the optical alignment feature comprises a feature defining at least a groove in the first body which is sized to support a section of the optical fiber.

5. The ferrule assembly as in claim 4, wherein the groove is structured to securely retain the section of optical fiber in the groove by clamping the optical fiber.

6. The ferrule assembly as in claim 5, wherein the groove is an open groove structured to support terminating end sections of the optical fiber, wherein the terminating section of the optical fiber is bare, with cladding exposed.

7. The ferrule assembly as in claim 6, wherein at least one of the first body and the second body is structured with a recess for receiving at least part of a protective layer of the optical fiber.

8. The ferrule assembly as in claim 4, wherein first body comprises a feature defining a plurality of pin grooves on the surface of the first body, wherein each pin groove has a longitudinal opening, and wherein each groove is sized and shaped to securely retain an alignment pin in the groove by clamping the alignment pin.

9. The ferrule assembly as in claim 4, wherein the optical alignment feature is structured to support an array of optical fibers.

10. The ferrule assembly as in claim 9, wherein the optical alignment feature comprises a feature defining a plurality of grooves, each sized to support a section of a respective optical fiber.

11. The ferrule assembly as in claim 4, wherein the second body is structured with a flat surface at the side opposing the first ferrule component, and wherein the flat surface faces the groove on the first body.

12. The ferrule assembly as in claim 1, wherein the optical alignment feature comprises a feature defining at least a first groove in the first body and at least a second groove in the second body, wherein the first and second grooves together support a section of the optical fiber.

13. The ferrule assembly as in claim 1, wherein the web has a reduced thickness compared to thickness of the first ferrule component and the second ferrule component.

14. The ferrule assembly as in claim 1, wherein the first ferrule component and the second ferrule component are maintained in the folded over configuration by a fastening mechanism.

15. The ferrule assembly as in claim 14, wherein the fastening mechanism comprises a snap coupling based on features defined on the first and second ferrule components.

16. An optical fiber connector, comprising:
   a ferrule assembly as claimed in claim 1; and
   a housing supporting the ferrule.

17. A method of producing a ferrule assembly as in claim 1, comprising forming at least the first body having the groove from a blank.

18. A method of producing a ferrule assembly for supporting an optical fiber in an optical fiber connector, comprising:
   forming a first ferrule component having a first body structured with an optical alignment feature for an optical fiber defined in the first body;
   forming a second ferrule component having a second body; and
   forming a web connecting the second ferrule to the first ferrule, wherein the web is flexible to allow folding of the second ferrule component over the first ferrule component, wherein the optical fiber is held between opposing sides of the first ferrule component and the second ferrule component in a folded over configuration, and
   wherein the first body, second body and the web are part of a monolithic metal structure that is stamped formed.

19. The method of producing a ferrule assembly as in claim 18 wherein the first ferrule component, the second ferrule component and the web are formed from a same blank.

* * * * *